Figure 1:
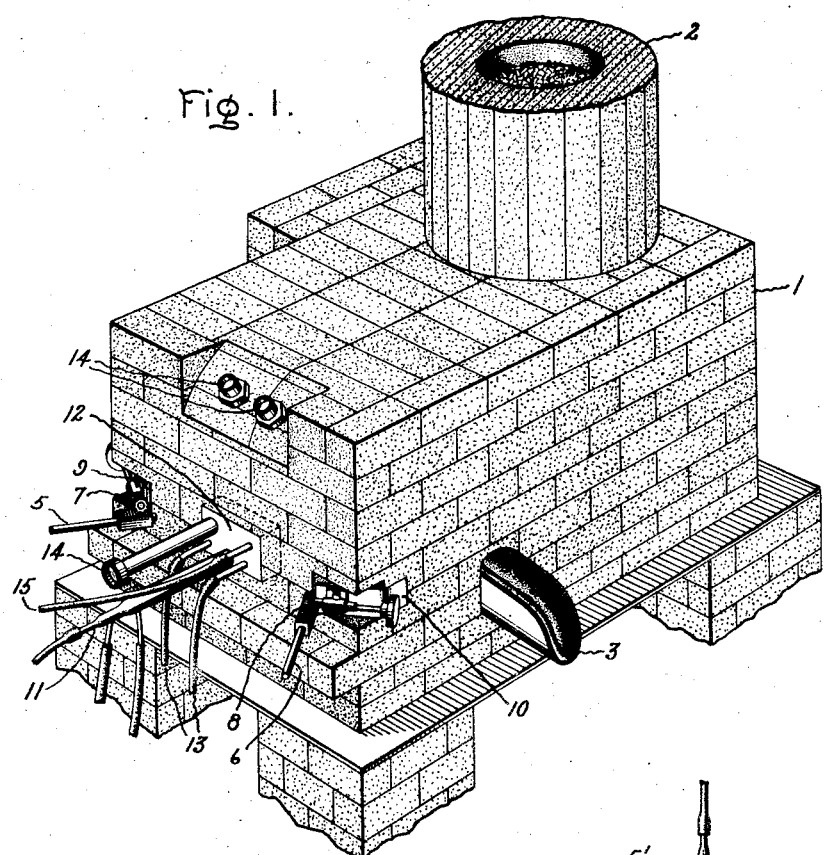

Feb. 13, 1934.  I. LANGMUIR  1,947,267
HEATING PROCESS AND APPARATUS
Filed July 30, 1924  2 Sheets-Sheet 1

Inventor:
Irving Langmuir,
by *Alexander E. Lentz*
His Attorney.

Feb. 13, 1934.　　　I. LANGMUIR　　　1,947,267
HEATING PROCESS AND APPARATUS
Filed July 30, 1924　　2 Sheets-Sheet 2

Inventor:
Irving Langmuir,
by
His Attorney.

Patented Feb. 13, 1934

1,947,267

UNITED STATES PATENT OFFICE 1,947,267

HEATING PROCESS AND APPARATUS

Irving Langmuir, Schenectady, N. Y., assignor to General Electric Company, a corporation of New York Application July 30, 1924. Serial No. 729,185

11 Claims. (Cl. 219—14)

The present invention comprises a new method and apparatus for carrying out technical operations requiring high temperatures, such, for example, as the fusion of metals. In the practice of my invention the thermal dissociation of hydrogen at high temperature to form what I call "atomic hydrogen" in my papers published in The Journal of the American Chemical Society, vols. 36 (1914) page 1708, and 37 (1915) page 414, is utilized for industrial heating and metallurgical operations.

The dissociation of the ordinary form of molecular hydrogen to atomic hydrogen consumes or renders latent a relatively large amount of heat which is again liberated when the atomic hydrogen is converted back to the molecular state.

In accordance with my invention, I have provided new heating devices and new methods of carrying out heating operations wherein the latent heat of dissociation of hydrogen is utilized to convey heat efficiently from a heat source, such as an arc, to the work to be heated.

As will later appear in greater detail, various important technical advantages result from the practice of my invention. In one aspect the conversion of molecular hydrogen at the source of heat into atomic hydrogen and the utilization of atomic hydrogen for heating the work is comparable to the conversion of water to steam and the utilization of the steam for heating accompanied by its condensation to water.

The active reducing character of atomic hydrogen is a new property for which no analogy exists in the case of steam, and which renders atomic hydrogen as a source of heat of peculiar advantage in processes, such as welding in which oxidation should be avoided.

The method of welding metals according to the principle of my invention is claimed in the application of Robert Palmer, Serial No. 729,188, filed concurrently herewith, and assigned to the same assignee as the present application.

My invention in one of its more specific aspects comprises a furnace applicable to the fusion of metals wherein the dissociation of hydrogen is carried out by an electric arc, and atomic hydrogen is conveyed to the work by a current or blast of molecular hydrogen. Such a furnace may be utilized for heating a charge which, because of its bulky nature, is not readily susceptible to being heated efficiently by an ordinary arc. Metal scrap, for example, may be melted advantageously in a furnace embodying my invention. Heating by atomic hydrogen also may be utilized for purposes other than fusion as will later appear. The application of the principle of my invention to heating and melting furnaces is described and claimed in my divisional application Serial No. 371,316 filed June 17, 1929.

Other novel features of my invention will be described in the folowing specification and pointed out with particularity in the appended claims.

Figure 2:
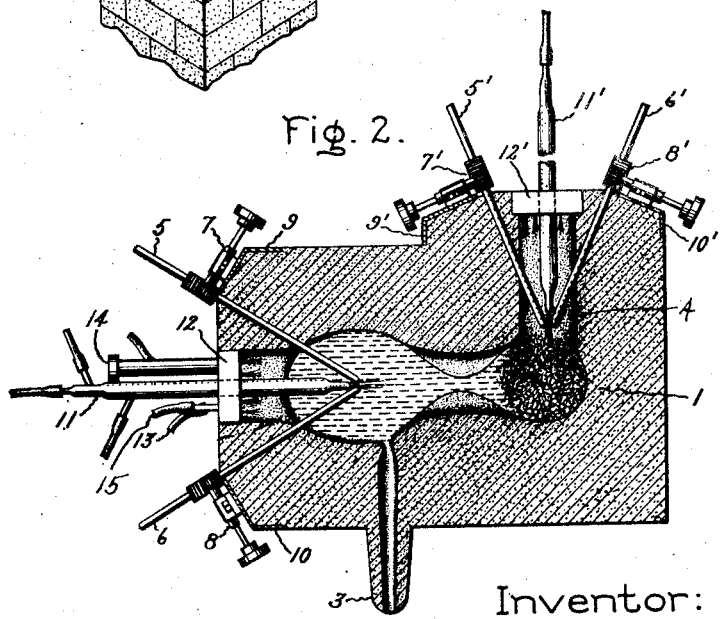
Figure 3:
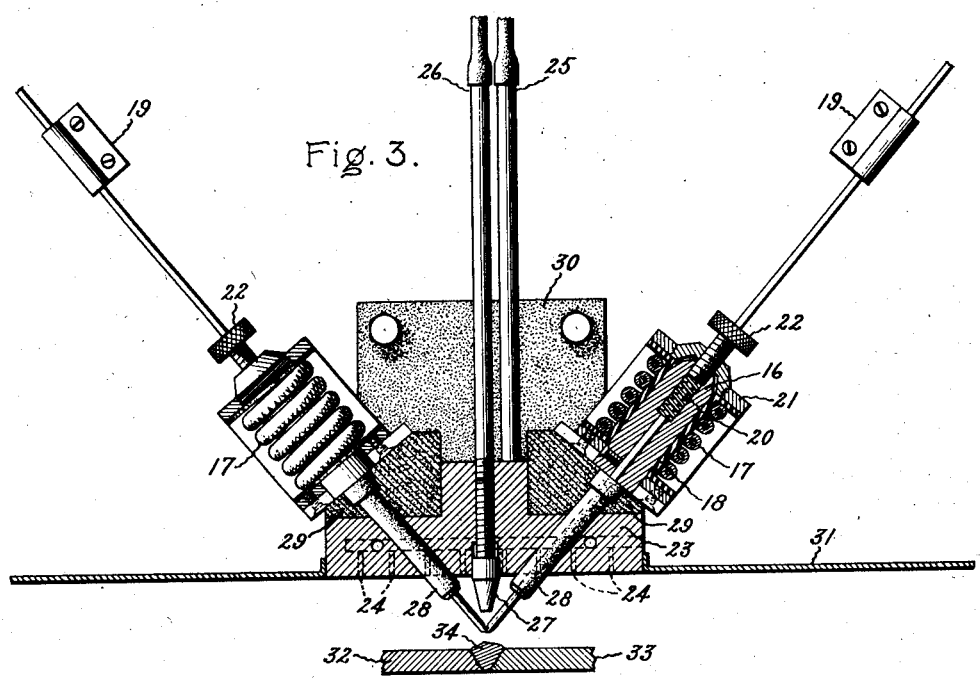
Figure 4:
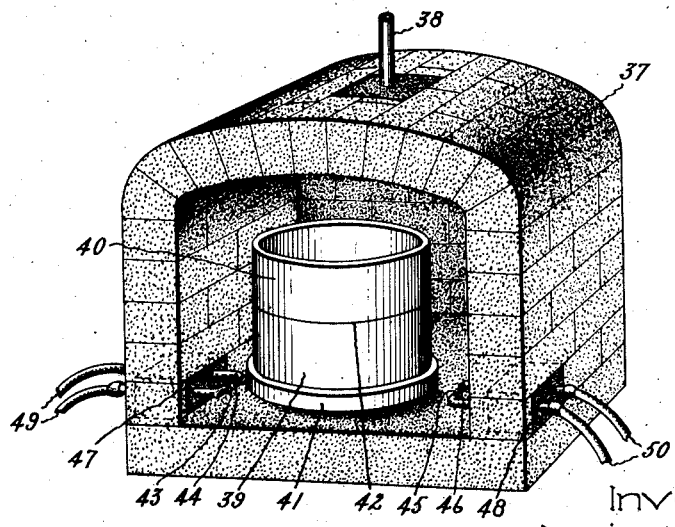

In the accompanying drawings, Fig. 1 shows in perspective a scrap melting furnace embodying my invention; Fig. 2 is a horizontal section of the same furnace; Fig. 3 is a view partly in section of a welding device embodying my invention in which an arc is employed, and Fig. 4 illustrates in vertical section a brazing furnace wherein a hydrogen atmosphere is heated by arcs effecting the dissociation of part of the hydrogen.

The furnace shown somewhat diagrammatically in Figs. 1 and 2 may consist of fire-brick and comprises a fusion chamber 1 and a stack 2, into which scrap iron or other material to be melted is charged. The stack, to advantage, may widen or flare somewhat as it joins the fusion chamber.

The drawings show two sets of heaters or torches projecting into the furnace, but, of course, only one heater or a larger number may be used according to circumstances. One heater projects into the fusion chamber 1 where the molten metal accumulates and from which it is discharged by a spout 3 and the other heater projects into a horizontal passage 4, leading to the stack 2. Although both heaters cooperate to fuse the charge, the heater projecting into the fusion chamber mainly serves to heat the collected molten material above its melting point.

The apparatus illustrated whereby hydrogen is dissociated comprises arc-supporting electrodes 5, 6, held in hand-operated regulating devices 7, 8, which in turn are supported upon plates 9, 10 set into the wall of the furnace. A stream of hydrogen, preferably dried hydrogen, is directed through an arc being operated between these electrodes and passes from the arc into contact with the work. The hydrogen is supplied by a water-cooled tube 11 which projects through a base 12 containing ducts (not shown) supplied with water or other cooling fluid by the tubes 13. The other hydrogen torch being similar in construction has been indicated by the same reference numerals primed. The hydrogen supply tube 11 preferably is tipped with a nozzle of molybdenum or other refractory metal. A sight tube 14 may be provided to assist in regulating the arc.

The electrodes may consist of highly refractory metal as, for example, tungsten. When an arc is operated between the electrodes, the stream of ordinary molecular hydrogen passing into contact with the arc is dissociated into atomic hydrogen, the dissociation being accompanied by the absorption of heat from the arc. With an input of about 25 kilowatts and electrodes of about ⅜" in diameter, separated about ⅛ to ¼", an arc voltage of about 100 volts can be used. The arc is bowed out by the hydrogen blast. Much higher energy arcs and greater lengths of arc can be used. For most commercial uses furnaces of greater power running into hundreds of kilowatts are preferable. The arcs may be operated with either direct or alternating current. In the former case a series resistance is necessary. In the latter case a series reactance can be used or the energy may be derived from a constant current transformer.

The arc assumes in hydrogen at atmospheric pressure or at higher pressures a concentrated form, and operates at relatively high voltage. By blowing the arc outwardly by a transverse blast of hydrogen the operating voltage may be raised to 600 volts or higher values. The electrodes remain substantially intact, or in other words, are not consumed by the arc.

Experiments indicate that the heat rendered latent by the dissociation of one gram of hydrogen is about 42,000 calories. As this latent heat of dissociation is set free when the atomic hydrogen again combines or "burns" to form ordinary hydrogen after having left the arc, this relatively large amount of heat is set free and is conveyed to the work. The dissociation of the hydrogen efficiently carries heat from the arc to the work, in this case represented by the metal scrap, which has a relatively large mass, whereas an electric arc when playing directly upon the work would heat only local parts of the mass. The hydrogen also maintains a reducing atmosphere thereby preventing oxidation of the material being melted. Low pressure bathing hydrogen may be supplied to the interior of the furnace by a conduit 15.

The welding apparatus shown in Fig. 3 in its essential elements is similar to the heating torch shown in Fig. 2, but is adapted particularly to give greater localization of the zone of fusion which is affected by the atomic hydrogen. In this welding device the hydrogen blast is operated in the open, that is without the enclosing casing which is characteristic of a furnace. In this welding apparatus the electrodes also preferably consist of tungsten, although other refractory metals, such as molybdenum, can be used, and in fact water-cooled electrodes of metals of lower fusing point can be used. The electrodes are each connected to an iron core which is shown at 16 in the sectionalized right-hand part of the figure. The electrodes are connected to the cores in any suitable way as by set screws. The cores are magnetically controlled by windings 17 which are respectively wound upon flanged cylindrical supports 18 which are spaced away from the cores. These windings are connected in series with the electrodes to a suitable source of current. Electric current terminals 19 have been indicated for the electrodes, but the electric connections have been omitted for the sake of simplicity. When current flows through the windings the cores 16 are lifted within the coils thereby compressing springs 20 between the cores and caps 21. The tension of the springs may be regulated by thumb screws 22 and thereby the length of the arc may be controlled. Above the arcing tips of the electrodes is provided a metal plate 23 which contains a number of ducts 24 communicating with a conduit 25 whereby low pressure bathing hydrogen may be supplied about the work so as to prevent air being drawn into the jet of hydrogen and also to prevent undue oxidation of the fused metal which is not in direct contact with the hydrogen jet. The jet of hydrogen is delivered by a conduit 26 which is tipped by a nozzle 27 of refractory metal, such as molybdenum. Although I deem it preferable to deliver a bathing atmosphere of hydrogen about the work for the purposes noted above, successful results may be obtained by using the hydrogen jet alone, it being merely essential that there be an atmosphere of hydrogen circumambient the arc and in contact with the molten portions of the work to displace and exclude air or other deleterious gases and vapors. The electrodes are insulated respectively from the plate 23 by lava bushings 28 and are mounted upon supports 29 consisting of suitable refractory material which are in turn mounted upon a bracket 30 also consisting of some suitable refractory material, such as an asbestos composition made with a mineral binder. A shield 31 preferably is provided to protect the operator and prevent undue heating of the coils and other parts of the apparatus, but more particularly to help conserve the bathing hydrogen.

Welding may be carried out by a welding torch of the character described by fusing a desired metal between the parts to be united by the jet of atomic hydrogen. The work to be welded is illustrated somewhat diagrammatically in the drawings as comprising two plate-shaped members 32, 33 united by a quantity of metal 34. Not only the binding metal 34 but also the adjoining parts of the work are fused and commingled by the heat of the atomic hydrogen blast. The welds made in this way are stronger, more malleable and ductile and less corrodible than welds made by ordinary arc welding or ordinary gas welding. The fused metal is sound, free from oxides, nitrides or similar impurities and in fact is chemically refined by the atomic hydrogen.

Metals such as chromium, zirconium, aluminum and the like, which are easily oxidized, can be introduced into fusion welds by carrying out the process in the presence of atomic hydrogen, because of the active reducing character of the atomic hydrogen.

My invention may be applied to the heating of work which is not in direct contact with the flame of recombining atomic hydrogen as illustrated in Fig. 4.

In this figure is shown a furnace comprising a refractory enclosure 37, which is supplied with hydrogen by a conduit 38. A circulation of hydrogen may be maintained by carrying away excess hydrogen through an outlet tube (not shown). In this furnace heating operations of various kinds may be effected, such as the brazing of ferrous metal parts, as indicated by the cylinders 39, 40 which rest on a support 41, and are to be joined to each other by a layer of copper at 42. In order to heat the work to the requisite temperature above the fusing temperature of copper a plurality of arcs are operated in the hydrogen atmosphere in the furnace. The arc electrodes have been somewhat diagrammatically indicated at 43, 44 and 45, 46. These electrodes may consist of rods of tungsten or other refractory metal, having pointed tips facing one another. The electrodes respectively project through blocks 47, 48 consisting of highly refractory material and are connected to the supply conductors 49, 50.

Well-known means (not shown in Fig. 4) may be used to bring the electrodes into contact either by hand or automatically to start the arcs, or they may be started by high voltage.

In the modification shown in Fig. 4 active convection currents are set up, and the high heat conductivity due to the presence of the atomic hydrogen causes a distribution of the heat which is abstracted from the arc by the dissociation of the hydrogen. In this way a required brazing temperature can be readily obtained throughout the furnace, whereas ordinary electric arcs would overheat the parts adjacent to the arc and insufficiently heat more remote parts.

What I claim as new and desire to secure by Letters Patent of the United States, is,—

1. The method of transferring heat from an electric arc to a medium to be heated which consists in establishing an atmosphere of hydrogen about said arc, directing a blast of hydrogen at higher pressure in contact with said arc, thereby dissociating hydrogen to the atomic state and causing the dissociated hydrogen to recombine and give up heat to the medium to be heated.

2. A heating apparatus comprising means for operating an electric arc, means for directing a stream of hydrogen upon said arc and means for supplying hydrogen at lower pressure than said stream to the space about said arc.

3. A heating apparatus comprising cooperating electrodes of refractory metal, means for operating an electric arc between said electrodes, a conduit for directing a stream of hydrogen transversely to said arc, and means for supplying hydrogen at lower pressure to a space about said arc.

4. A welding device adapted for welding in the open air comprising means for maintaining an arc and means for directing a localized blast of hydrogen across the arc to produce a stream of atomic hydrogen adapted to be played upon the parts to be fused to produce local fusion thereof and means for excluding air from the space about the arc and the area of the work under fusion.

5. An arc welding device of the type where fusion along the line of the weld is effected by relative movement between the welding device and the work to be welded, comprising means whereby an arc may be maintained between a pair of electrodes, means for directing a localized blast of hydrogen through the arc upon the work to be welded whereby energy from the arc is transferred to the work by the dissociation of molecular hydrogen to atomic hydrogen in the arc and the release of said energy locally at the point of fusion by recombination of atomic hydrogen to molecular hydrogen, and means whereby a flow of gas may be maintained circumambient the arc to exclude deleterious gases and vapors from the area being fused.

6. An arc welding apparatus comprising a welding head provided with a pair of refractory metal electrodes between which an arc is maintained adjacent the work to be welded, means for directing a localized blast of hydrogen through the arc upon the work, said blast being dissociated to atomic hydrogen by energy imparted from the arc, the work being fused locally at the point of welding by heat released by the recombination of the hydrogen atoms, said welding head being constructed to provide a cover arranged to prevent the flow of gases in a direction from the work to the welding head and means whereby hydrogen may be supplied to produce a flow of hydrogen between said cover and the work in a direction from the cover toward the work throughout the area comprising the arc and point of welding to displace atmospheric air from the space between the cover and the work.

7. An arc welding apparatus comprising a welding head provided with a pair of tungsten electrodes between which a welding arc is adapted to be maintained adjacent the work to be welded, means for directing a localized blast of hydrogen through the arc upon the work, said welding head being constructed to provide a cover over the work below which cover the electrodes project, said cover being provided with openings whereby a flow of hydrogen may be produced between the cover and the work circumambient the arc to exclude deleterious gases and vapors.

8. The method of usefully conveying high temperature heat to a body which consists in supplying heat to molecular hydrogen by an electric arc, passing the hydrogen directly from the arc to said body and maintaining the arc at such voltage and current as to cause substantial quantities of atomic hydrogen to be formed from the molecular hydrogen and to pass to such a point that energy is liberated by the recombination of substantial quantities of atomic hydrogen in the neighborhood of said body and usefully heats said body.

9. The method of usefully conveying high temperature heat to a body which consists in passing molecular hydrogen through an electric arc, passing the hydrogen directly from the arc to said body and maintaining the arc at such voltage and current as to cause substantial quantities of atomic hydrogen to be formed from the molecular hydrogen and to pass to such a point that energy is liberated by the recombination of substantial quantities of atomic hydrogen in the neighborhood of said body and usefully heats said body.

10. The method of usefully conveying high temperature heat to a body which consists in passing hydrogen at pressure at least as high as atmospheric pressure through an electric arc, passing the hydrogen directly from the arc to said body and maintaining the arc at such voltage and current as to cause substantial quantities of atomic hydrogen to be formed from the molecular hydrogen and to pass to such a point that energy is liberated by the recombination of substantial quantities of atomic hydrogen in the neighborhood of said body and usefully heats said body.

11. The method of usefully conveying high temperature heat to a body which consists in passing molecular hydrogen through a concentrated high voltage arc, passing the hydrogen directly from the arc to said body and maintaining the arc at such voltage and current as to cause substantial quantities of atomic hydrogen to be formed from the molecular hydrogen and to pass to such a point that energy is liberated by the recombination of substantial quantities of atomic hydrogen in the neighborhood of said body and usefully heats said body.

IRVING LANGMUIR.